United States Patent [19]

Hirata et al.

[11] 3,969,329

[45] July 13, 1976

[54] PROCESS FOR PRODUCING HIGH MOLECULAR WEIGHT ACRYLAMIDE WATER-SOLUBLE POLYMERS BY CONTROLLING THE VISCOSITY OF THE POLYMERIZATION REACTION MEDIUM WITH A WATER-MISCIBLE ORGANIC SOLVENT

[75] Inventors: Eiichi Hirata, Toyonaka; Shin-ichi Isaoka, Kyoto; Shiro Sakai, Higashiosaka, all of Japan

[73] Assignee: Sumitomo Chemical Company, Limited, Japan

[22] Filed: Jan. 16, 1975

[21] Appl. No.: 541,623

[30] Foreign Application Priority Data

Jan. 16, 1974 Japan.................................. 49-8069

[52] U.S. Cl............................ 260/79.3 M; 210/54; 526/81; 526/202; 526/204; 526/208; 526/217; 526/303; 526/317

[51] Int. Cl.².................. C08F 28/00; C08G 75/00; C08F 120/52; B01D 21/01

[58] Field of Search............... 260/79.3 M, 85.5 AM, 260/80.3 N, 89.7 R, 89.7 N, 88.3 R, 86.1 N

[56] References Cited
UNITED STATES PATENTS

| | | | |
|---|---|---|---|
| 2,289,540 | 7/1942 | Dittmar et al. | 260/89.7 R X |
| 2,741,652 | 4/1956 | Miller | 260/89.7 R X |
| 3,200,098 | 8/1965 | Goren | 260/80.3 |
| 3,336,269 | 8/1967 | Monagle et al. | 260/79.3 MU |
| 3,336,270 | 8/1967 | Monagle | 260/79.3 MU |
| 3,509,113 | 4/1970 | Monagle et al. | 260/79.3 MU |
| 3,617,573 | 11/1971 | Monagle | 260/79.3 MU |
| 3,681,215 | 8/1972 | Peterson | 260/89.7 R X |

*Primary Examiner*—Joseph L. Schofer
*Assistant Examiner*—Herbert J. Lilling
*Attorney, Agent, or Firm*—Stewart and Kolasch, Ltd.

[57] ABSTRACT

Water-soluble high molecular weight polymers, useful as coagulating agents, are prepared by initiating the polymerization of acrylamide or a monovinyl monomer mixture containing a predominant amount of acrylamide in an acetone-water mixture at a temperature of not lower than 5°C but of lower than 25°C in the presence of polyvinyl alcohol and a catalyst, the concentration of the monomer in the polymerization reaction mixture being 15 to 30 % by weight and the concentration of acetone in the acetone-water mixture being 15 to 35 % by weight, and continuing the polymerization reaction while controlling the viscosity of the reaction system by adding a water-miscible organic solvent having a small chain transfer coefficient to the reaction system with the progress of the polymerization reaction.

7 Claims, No Drawings

PROCESS FOR PRODUCING HIGH MOLECULAR WEIGHT ACRYLAMIDE WATER-SOLUBLE POLYMERS BY CONTROLLING THE VISCOSITY OF THE POLYMERIZATION REACTION MEDIUM WITH A WATER-MISCIBLE ORGANIC SOLVENT

The present invention relates to an improved process for producing polyacrylamide polymers. More particularly, it relates to a process for the production of polyacrylamide polymers having a high degree of polymerization.

It is well known that the activity of a coagulating agent for a high molecular weight polymer, especially for a polyacrylamide polymer, tends to be proportional to the molecular weight. Recently, a high molecular weight polyacrylamide polymer having a large intrinsic viscosity has become known as an excellent coagulating agent exhibiting remarkable effects in the promotion of coagulation precipitation and clarification filtration, and the demand for such a high molecular weight polyacrylamide polymer has been increased in a variety of fields including the water treatment field such as the treatment of waste water from factories and of muddy water.

Hitherto, the production of such high molecular weight polyacrylamide has been effected by aqueous solution polymerization or precipitation polymerization. The former method is the most suitable for the production of a high polymer, but the reaction solution becomes highly viscous so as to make the handling thereof very difficult. The latter method is advantageous in producing a powdery polymer utilizable with ease, and the elimination of impurities such as unreacted starting materials can be satisfactorily attained by washing. However, since an organic solvent is employed as the reaction medium, there arises a problem of a chain transfer reaction, and the production of a high polymer is difficult.

In the precipitation polymerization, there may be employed, as the reaction medium, an organic solvent alone, or alternatively, a mixture of water and an organic solvent which is miscible with water and does not dissolve the produced polymer. By the combined use of an organic solvent with water, the production of a high polymer is relatively facile, compared with the case of the sole use of an organic solvent.

For the polymerization by such combined use of an organic solvent with water, there is known the process described in U.S. Pat. No. 3,509,113 (Hercules Corp.), in which the reaction is carried out in a mixture of acetone and water at a temperature of 25° to 65°C with a monomer concentration of 10 to 50%, the acetone concentration in the acetone-water mixture being 30 to 70%. There is also known the process described in Japanese Patent Publication No. 48903/1972 (Sumitomo Chemical Company, Limited), in which a mixture of acetone and water having a lower acetone concentration of 23 to 30% is used as the reaction medium together with polyvinyl alcohol. In the former process (Hercules Corp.), however, the polymerization degree of the produced polymer is low, and a polymer having an extremely high molecular weight as mentioned above cannot be obtained. By the latter process (Sumitomo Chemical Company, Limited), the use of acetone in a low concentration has been made industrially practicable, but the production of a high polymer having a sufficiently high molecular weight as mentioned above is also difficult. Though a product having a relatively high molecular weight is obtained sometimes by polymerization at a relatively low temperature with a monomer concentration of 10 to 30%, in that case the stability of the slurry in the reaction system is insufficient and hence the yield of the reaction is low. Thus, the process is not advantageous from the industrial viewpoint.

As the results of extensive studies seeking an industrially practicable process for production of a high molecular weight polyacrylamide polymer having an extremely large intrinsic viscosity with ease in a good yield by the precipitation polymerization using a mixture of acetone and water as the reaction medium, it has now been found that a polyacrylamide polymer having an extremely high molecular weight can be obtained in a good yield when the reaction is carried out in a specific manner different from conventional procedures under a specific combination of the acetone concentration, the monomer concentration and the polymerization temperature.

According to the present invention, there is provided a process for producing a water-soluble high molecular weight polymer having a high degree of polymerization which comprises initiating the polymerization of acrylamide or a monovinyl monomer mixture containing a predominant amount of acrylamide in an acetone-water mixture at a temperature of not lower than 5°C but of lower than 25°C in the presence of polyvinyl alcohol and a catalyst, the concentration of the monomer in the polymerization reaction mixture being 15 to 30% by weight and the concentration of acetone in the acetone-water mixture being 15 to 35% by weight, and continuing the polymerization reaction while controlling the viscosity of the reaction system by adding a water-miscible organic solvent having a small chain transfer coefficient to the reaction system with the progress of the polymerization reaction.

The important features of the invention reside in the following two points: (1) the monomer concentration, the acetone concentration and the polymerization temperature are respectively within the above mentioned ranges of limitation; and (2) the polymerization is effected while controlling the viscosity of the reaction system by the addition of the above mentioned organic solvent with the progress of the reaction. If either one of the said two conditions is missing, the object of the invention cannot be attained.

The monomer concentration is selected from the range of 15 to 30% by weight, and the polymerization temperature should be not lower than 5°C but lower than 25°C. When the concentration and the temperature do not reach the said respective values of lower limitation, the reaction rate becomes extremely small to require a long time for completion of the reaction. On the other hand, when they exceed the said respective values of upper limitation, the reaction rate becomes too large, so that the viscosity of the reaction system is extraordinarily increased and the stability of the slurry is lowered. Even if a polymer of relatively high polymerization degree can be obtained, the yield of the reaction is unsatisfactorily low. Thus, with a concentration and a temperature being out of the said respective ranges of limitation, the industrial execution of the polymerization becomes very difficult. The acetone concentration is selected from the range of 15 to 35% by weight, preferably not lower than 23% but lower than 30%. When it is smaller than 15%, the viscosity of the reaction system becomes too large, so that the stability of the slurry is lowered and the control of the reaction is very difficult even with the addition of the above mentioned organic solvent. When the concentration is larger than 35%, on the contrary, the slurry becomes somewhat stable, but a product of high polymerization degree cannot be obtained.

As the catalyst, there may be used any one which in soluble in a mixture of acetone and which water and affords a radical upon decomposition. Particularly preferred are water-soluble peroxides (e.g. hydrogen peroxide, potassium persulfate, ammonium persulfate) and azobisisobutyronitrile. Redox system catalysts such as potassium persulfate and sodium hydrogen bisulfite, an amine or sodium formaldehydesulfoxylate can be also used. The redox system catalyst may contain at least one Lewis acid such as chlorides and bromides of aluminum, antimony, lithium and zinc. The amount of the catalyst is normally from about 0.01 to about 0.2% by weight on the basis of the weight of acrylamide or the monovinyl monomer mixture.

Though there may be used any polyvinyl alcohol which is commercially available, ones having a saponification degree of about 85 to about 90%, and a polymerization degree not lower than 1500 (commercially available "Gosenol GH-17") are favorably used. The amount of polyvinyl alcohol may be usually from about 0.5 to about 4% by weight, preferably from about 1 to about 2% by weight on the basis of the weight of acrylamide or the monovinyl monomer mixture.

As the monovinyl monomer which is optionally used together with acrylamide, there may be employed a monomer which is soluble in a mixture of acetone and water and whose copolymer with acrylamide is insoluble or hardly soluble in the said mixture such as (1) acrylonitrile, (2) an anionic monomer (e.g. acrylic acid, methacrylic acid, their metal or ammonium salts, sodium vinylsulfate, sulfonated styrene) or (3) a basic monomer which becomes cationic when quaternized (e.g. vinylpyridine, dialkylaminoalkyl acrylate, dialkylaminoalkyl methacrylate).

When the polymerization is initiated under the above mentioned conditions of the monomer concentration, the acetone concentration and the reaction temperature, the viscosity of the reaction system is increased with the progress of the reaction, resulting in the decrease of the stability of the slurry, and stirring of the reaction system becomes impossible to make the control of the reaction extremely difficult. Accordingly, in the present invention, a small amount of a water-miscible organic solvent having a small chain transfer coefficient is added to the reaction system when the viscosity of the reaction system reaches a certain extent, or more concretely, just before the Weissenberg phenomenon begins to occur, or more specifically, about 1 to 2 hours after the reaction system turns turbid, in order to decrease the viscosity to such an extent that the Trommsdorff effect is not inhibited. By repeating this procedure, or more specifically, by continuous or intermittent addition of said solvent at intervals of 30 to 180 minutes, until completion of the reaction so as to maintain the viscosity of the reaction system in such a range that the Trommsdorff effect is not inhibited and the Weissenberg effect is just going to appear, the polymerization can smoothly proceed in a stable slurry state.

The amount of the organic solvent added is desired to be 1 to 5% by weight per each time of addition on the basis of the total amount of the reaction system. When the amount is larger than the said upper limit, the viscosity of the reaction system becomes too low, so that the reaction rate is extremely reduced and a product of high polymerization degree cannot be obtained. When the amount is smaller than the said lower limit, the decrease of the viscosity is insufficient to make the control of the reaction difficult. The number of times of the addition may be appropriately decided depending on the rate of polymerization and other reaction conditions, but at least one time of the addition is necessitated. Usually, the addition is executed 3 to 8 times.

As the organic solvent to be added, there may be exemplified acetone, acetonitrile, dioxane, tetrahydrofuran,. etc. They may be used alone or in combination, or in admixture with water, Particularly, the use of acetone which is employed also as the reaction medium is preferred, because it can be obtained cheaply and can be recovered with ease due to its low boiling point.

Thus, the polymerization of the invention is initiated under the above mentioned conditions of the acetone concentration, the monomer concentration and the polymerization temperature and continued while controlling the viscosity of the reaction system to the above mentioned range by the addition of the above mentioned organic solvent to the reaction system with the progress of the reaction. When the polymerization is initiated under conditions out of the said ranges, the viscosity of the reaction system becomes too small or large, and, in many cases, the maintenance of the viscosity in the said range becomes impossible or very difficult even with the addition of the said organic solvent, or even if it can be attained, the desired high molecular weight polymer cannot be obtained in a high yield. Further, when the polymerization is performed without such addition of the organic solvent, the production of a high molecular weight polymer cannot be attained even if the reaction is initiated under the above mentioned conditions of limitation, not to mention the case of the initiation of the reaction under conditions out of the said ranges of limitation. Thus, the production of a polymer of high polymerization degree in a good yield can be industrially executed with ease only by initiating the polymerization under the said specific conditions and continuing the reaction while controlling the viscosity of the reaction system to the said specific range by the addition of the said specific organic solvent with the progress of the reaction.

The isolation of the produced polymer from the reaction mixture is performed by adding a large amount of an organic solvent which is miscible with water and does not dissolve the produced polymer to the reaction mixture and then filtrating the resultant mixture. The amount of the organic solvent added is usually 1.0 to 5.0 times by weight as large as that of the acetone initially employed in the polymerization. The thus collected product is then dried, if necessary after further washing.

For obtaining the product in the form of uniform granules, it is preferred that the organic solvent is first added to the reaction mixture in an amount 0.1 to 1.0 times by weight as large as that of the acetone initially employed and then the temperature is elevated up to 30° to 50°C, preferably 35° to 45°C, prior to the addition of a large amount of the organic solvent.

As such organic solvent, there may be exemplified acetone, acetonitrile, dioxane, tetrahydrofuran,. etc. The use of acetone which is employed also as the reaction medium is the most preferred, because it can be obtained cheaply and can be recovered with ease.

The addition of a large amount of the organic solvent to the reaction mixture is executed for the purpose of facilitating the collection of the produced polymer by the filtration. Namely, in the reaction mixture after the polymerization, the surface of the granules of the produced polymer is partially dissolved in the water contained in the reaction system and thus becomes adhesive so as to make the direct filtration somewhat difficult. By the addition of the solvent, the concentration of water contained in the reaction mixture is reduced and such dissolution of the polymer in water is decreased to prevent the surface of the polymer granules from becoming adhesive. The addition is also effective for elimination of unreacted starting materials by washing to afford a highly pure product.

As mentioned above, the present invention provides an industrially valuable process for the production of water-soluble polymers having an extremely high molecular weight in a high yield with ease, which production has been hitherto impossible or very difficult by conventional precipitation polymerization methods.

The water-soluble high polymer obtained according to the invention shows an excellent activity as a coagulating agent, compared with conventional high polymers, due to its extremely high molecular weight.

Practical and presently preferred embodiments of the invention are illustratively shown in the following Examples.

EXAMPLE 1

To a solution of acrylamide (168 g) and acrylic acid (52.5 g) in a mixture of water (455 g) and acetone (195 g) neutralized with a 10 N aqueous solution of sodium hydroxide (about 55 ml), a 5% aqueous solution of polyvinyl alcohol ("Gosenol GH-17") (40 g) is added, and the atmosphere in the reaction apparatus is replaced well by nitrogen gas to eliminate oxygen completely. Then, a 1% aqueous solution of potassium pesulfate (10 ml) and a 2% aqueous solution of sodium bisulfite (10 ml) are added thereto whereby a uniform, transparent solution is obtained. Within several minutes thereafter, the reaction begins, and the reaction solution turns white and turbid with the progress of the reaction. After about 1.5 hours of the reaction at 15°C under a nitrogen stream with stirring, the Weissenberg effect is just going to appear, when acetone (20 g) is gradually added to the reaction system in order to decrease the viscosity. The polymerization is thus executed for 6 hours while controlling the viscosity of the reaction system by the addition of acetone (20 g) every 0.5 to 2 hour, the total amount of acetone added being 100 g. After the reaction, the reaction mixture is admixed with acetone (40 g), heated up to about 40°C for 1 hour and further admixed with acetone (300 g). The precipitated product is collected by filtration to obtain a polymer in powder form, which is washed with acetone several times and dried under reduced pressure to give white granules. Yield of polymerization, 92%. Intrinsic viscosity, 20.0 (determined at 30°C in 1N-NaNO$_3$).

For comparison, the above polymerization procedure is repeated without the addition of acetone whereby the slurry is coagulated in about 2 hours.

EXAMPLE 2

The polymerization is executed in the same manner as in Example 1 but adding acetonitrile in place of acetone during the reaction whereby a polymer having an intrinsic viscosity of 19.5 is obtained in a polymerization yield of 90%.

EXAMPLE 3

A solution of acrylamide (184 g) and acrylic acid (58 g) in a mixture of water (439 g) and acetone (180 g) is neutralized with a 10 N aqueous solution of sodium hydroxide (about 83 g), and a 5% aqueous solution of polyvinyl alcohol (40 g) and zinc chloride (0.2 g) are added thereto. the atmosphere in the reaction apparatus is replaced well by nitrogen gas to eliminate oxygen completely, and a 1% aqueous solution of potassium persulfate (9 ml) and a 2% aqueous solution of tetramethylethylenediamine (9 ml) are added thereto whereby a uniform, transparent solution is obtained. Within several minutes thereafter, the reaction begins to make the reaction solution white and turbid. After about 3 hours of the reaction at 10°C under a nitrogen stream with stirring, the Weissenberg effect is just going to appear, when acetone (10 g) is added to the reaction system in order to decrease the viscosity. The polymerization is thus continued while controlling the viscosity of the reaction system by adding acetone (10 g) every time when the Weissenberg effect is just going to appear (appropriately every 1 hour). After completion of the reaction, acetone (250 g) is added to the reaction mixture to precipitate the product, which is then treated in the same manner as in Example 1 to give a copolymer (240 g) as granules. Intrinsic viscosity, 26.0.

For comparison, the above polymerization is executed without the addition of acetone whereby the coagulation of the slurry is caused about 5 hours after the initiation of the polymerization.

REFERENCE EXAMPLE 1

The polymerization is executed using acrylamide (168 g), acrylic acid (52.5 g), a 10 N aqueous solution of sodium hydroxide (about 55 ml), a 5% aqueous solution of polyvinyl alcohol (40 g), a 1% aqueous solution of potassium persulfate (10 ml) and a 2% aqueous solution of sodium bisulfite (10 ml) in the presence of acetone and water under the conditions as shown in Table 1.

The results are shown in Table 1.

Table 1

| No. | Acetone concentration (%) | Monomer concentration (%) | Polymerization temperature (°C) | State of reaction system | Reaction time (hrs.) | Polymerization yield (%) | Intrinsic viscosity |
| --- | --- | --- | --- | --- | --- | --- | --- |
| 1 | 40 | 22.5 | 15 | The viscosity is low. The reaction rate is extremely small. | 12 | 75 | 14 |
| 2 | 25 | 22.5 | 40 | The reaction rate is very large. The coagulation of the slurry is caused | 1.5 | 60 | 12 |

Table 1-continued

| No. | Acetone concentration (%) | Monomer concentration (%) | Polymerization temperature (°C) | State of reaction system | Reaction time (hrs.) | Polymerization yield (%) | Intrinsic viscosity |
|---|---|---|---|---|---|---|---|
| 3 | 25 | 35 | 15 | in a short time. The reaction rate is very large. The coagulation of the slurry is caused in a short time. | 1 | 50 | 20 |
| 4 | 40 | 22.5 | 40 | The reaction rate is large. The product is in rice grain form. The viscosity is low. | 6 | 90 | 10 |
| 5 | 25 | 10 | 15 | The viscosity is low. The reaction rate is extremely small. | 15 | 90 | 5 |

In Reference Examples 1 and 4, the product is precipitated in rice grain form, and the viscosity of the reaction system does not reach a height at which the weissenberg effect occurs. Therefore, the addition of acetone during the reaction is not executed.

In Reference Examples 2 and 3, the reaction rate is too large, so that the viscosity of the reaction system is greatly increased. Thus, the control of the viscosity cannot be executed even with the addition of acetone, and the slurry is finally coagulated.

In Reference Example 5, the reaction proceeds for the most part with a low viscosity, and at the final stage of the reaction, the Weissenberg effect is going to appear, when the addition of acetone is performed to continue the reaction.

In every polymerization, the reaction is stopped when the generation of the reaction heat is substantially ceased. Then, the reaction mixture is treated as in Example 1 to obtain a polymer, and the yield of polymerization and the intrinsic viscosity are determined.

What is claimed is:

1. A process for producing water-soluble high molecular weight polymers having a high degree of polymerization which comprises initiating the polymerization of acrylamide or a monovinyl monomer mixture containing a predominant amount of acrylamide in an acetone-water mixture at a temperature of not lower than 5°C. but of lower than 25°C. in the presence of polyvinyl alcohol and a catalyst, the concentration of the monomer in the polymerization reaction mixture being 15 to 30% by weight and the concentration of acetone in the acetone-water mixture being 15 35% by weight, and continuing the polymerization reaction while controlling the viscosity of the reaction system by adding at least one water-miscible organic solvent selected from the group consisting of acetone, acetonitrile, dioxane and tetrahydrofuran to the reaction system during the progress of the polymerization reaction.

2. The process according to claim 1, wherein said polyvinyl alcohol has a degree of saponification of about 85% to about 90% and a degree of polymerization of not lower than 1500.

3. The process according to claim 1, wherein the amount of the water-miscible organic solvent is 1 to 5% by weight per each time of addition on the basis of the total amount of the reaction system.

4. The process according to claim 1, wherein the addition of water-miscible organic solvent is executed 3 to 8 times during the polymerization reaction.

5. The process according to claim 1, wherein the concentration of acetone in the acetone-water mixture is 23 to 30% by weight.

6. the process according to claim 1, wherein the amount of the catalyst is from about 0.01 to 0.2% by weight on the basis of the weight of the monomer.

7. The process according to claim 1, wherein the amount of polyvinyl alcohol is from about 0.5 to about 4% by weight on the basis of the weight of the monomer.

* * * * *

UNITED STATES PATENT AND TRADEMARK OFFICE
CERTIFICATE OF CORRECTION

PATENT NO. : 3,969,329
DATED : July 13, 1976
INVENTOR(S) : Eiichi HIRATA et al

It is certified that error appears in the above-identified patent and that said Letters Patent are hereby corrected as shown below:

Column 8, line 18:

change "being 15 35% by weight" to read -- being 15 to 35% by weight --

Signed and Sealed this

Sixth Day of December 1977

[SEAL]

Attest:

RUTH C. MASON
*Attesting Officer*

LUTRELLE F. PARKER
*Acting Commissioner of Patents and Trademarks*